US009002986B2

(12) United States Patent
Chatenay

(10) Patent No.: US 9,002,986 B2
(45) Date of Patent: Apr. 7, 2015

(54) SYSTEMS AND METHODS FOR SHARING CUSTOMER ASSETS

(75) Inventor: David Chatenay, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2433 days.

(21) Appl. No.: 11/738,719

(22) Filed: Apr. 23, 2007

(65) Prior Publication Data

US 2008/0262862 A1    Oct. 23, 2008

(51) Int. Cl.
*G06F 15/16*    (2006.01)
*G06Q 30/02*    (2012.01)

(52) U.S. Cl.
CPC ..................................... *G06Q 30/02* (2013.01)
USPC ............................ 709/219; 709/228; 709/229

(58) Field of Classification Search
USPC ........................ 709/229; 726/2, 3, 8
See application file for complete search history.

(56) References Cited

U.S. PATENT DOCUMENTS

| 6,209,026 B1 * | 3/2001 | Ran et al. ...................... 709/218 |
| 6,505,238 B1 * | 1/2003 | Tran .............................. 709/208 |
| 7,330,876 B1 * | 2/2008 | Rawat et al. .................. 709/205 |
| 7,337,207 B2 * | 2/2008 | O'Brien et al. ............... 709/200 |

OTHER PUBLICATIONS ca Security Management. eTrust Single Sign-On. Jul. 24, 2006.
ca Security Management. eTrust SiteMinder. Market-Leading Web Access Management. Feb. 7, 2006.

* cited by examiner

*Primary Examiner* — Tauqir Hussain

(57) ABSTRACT

In one embodiment, a system or method for sharing customer assets includes receiving with a first regional service universal login information provided by a customer, the first regional service comprising one of multiple regional services that each comprises a distinct version of a network-based service, wherein each regional service is specific to a particular geographical region in which it is operated, accessing a central database with the first regional service to verify the universal login information, wherein the central database is accessible to each of the multiple regional services, and accessing the central database with the first regional service to access shared customer assets stored in the central database, wherein the shared customer assets stored in the central database are accessible to each of the multiple regional services.

20 Claims, 6 Drawing Sheets

SYSTEMS AND METHODS FOR SHARING CUSTOMER ASSETS

BACKGROUND

Often times, organizations support multiple versions of a web site associated with a given online service, with each version being specific to a different geographical region. For example, a single enterprise may support a separate web site in each of multiple countries around the globe. Certain advantages exist to providing a different web site in each of several different regions. For instance, when the enterprise offers goods that can be shipped to customers, separate regional web sites may facilitate local shipping of the goods at reduced cost. Furthermore, separate regional web sites enable the enterprise to control which goods are offered in which regional markets. Therefore, the goods offered by each web site can be tailored to suit local tastes or interests.

In many cases, each web site of the enterprise is operated independent of the others. In such cases, the customer may need to create a different account for each of the sites. Therefore, when a customer who normally accesses a first web site of the enterprise in a first country wishes to access a second web site of the enterprise in another country, for example when on vacation, the customer may be required to separately register with the second web site. Therefore, the customer may be forced to register with the same online service multiple times.

Furthermore, customer data stored by the enterprise in association with the first site may not be directly accessible from the second site. That problem can be addressed by separately storing the customer data in relation to each web site the customer wishes to use. Unfortunately, such a solution results in unnecessary duplication of customer data and creates difficulty in relation to maintaining data consistency between the various web sites. In another solution, the customer data can be indirectly accessed by using the second web site as a portal to the first web site. For example, when the second site is accessed, the customer can be queried as to whether the customer has an account with another web site of another geographical region. When the customer identifies the first web site, the customer may then be invited to log in with the first web site to access customer data associated with that web site. In such a situation, the customer is required to log in twice, once for the second web site and a second time for the first web site.

BRIEF DESCRIPTION OF THE DRAWINGS

The disclosed systems and methods can be better understood with reference to the following drawings. The components in the drawings are not necessarily to scale.

DETAILED DESCRIPTION

As described above, it would be desirable to have a system and method with which a single account can be used to access multiple sites of a given organization and with which the same customer data can be directly accessed using any of those sites. Examples of such systems and methods are described in the following disclosure.

Figure 1:
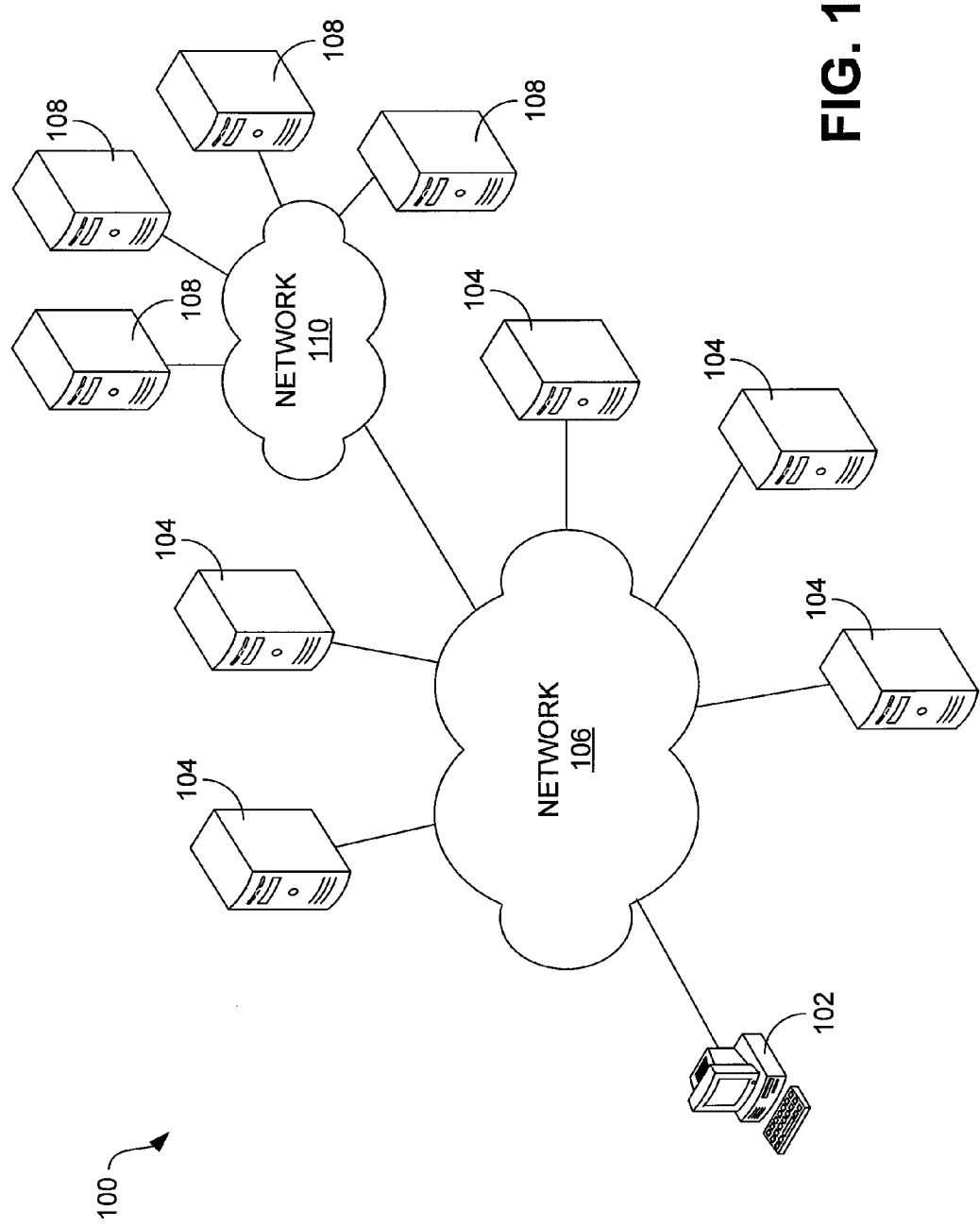
FIG. 1 is a schematic view of an embodiment of a system with which customer assets can be shared.

Referring to the drawings, in which like numerals indicate corresponding parts throughout the several views, FIG. 1 illustrates an example system 100 that can be used to share customer assets. As used in the present disclosure, the term "asset" refers to any data that is specific to and/or associated with a particular customer. Therefore, such assets may include a customer username, customer password, customer data files, customer payment information, customer shopping cart, customer shipping information, customer contact information, and any other information relevant to the customer's use of a network-based service. Furthermore, it is noted that although the term "customer" is used herein to identify users of the network-based service, the service may not always be a fee-based service.

As indicated in FIG. 1, the system 100 generally comprises a customer computer 102 and various server computers 104. In the embodiment of FIG. 1, the customer computer 102 comprises a personal computer (PC) that is configured to communicate with the server computers 104 via a network 106. Although PCs are illustrated in FIG. 1 by way of example, it will be appreciated that substantially any computing device capable of accessing the server computers 104 can be used.

The server computers 104 operate as hosts of regional versions of a network site used in association with the network-based service that is offered by a given organization. Therefore, each server computer 104 may be operated in and/or for a different geographical region, e.g., country. In some embodiments, the network-based service comprises an imaging service that can be used to manage, display, share, and print image data, such as photographic images, photograph albums, and video data. In further embodiments, the network-based service can also offer and provide goods that incorporate customer image data.

The network 106 can comprise one or more local area networks (LANs) and wide area networks (WANs) that are communicatively coupled to each other. In some embodiments, the network 106 comprises part of the Internet. Connected to the network 106 is a further network 110, which may comprise a LAN or WAN of the organization that provides the network-based service. Connected to the network 110 are one or more storage computers 108 that can be used to maintain a database of assets of various customers of the network-based service. The storage computers 108 therefore form a global or central database of data that, as described below, can be accessed by each of the server computers 104.

Figure 2:
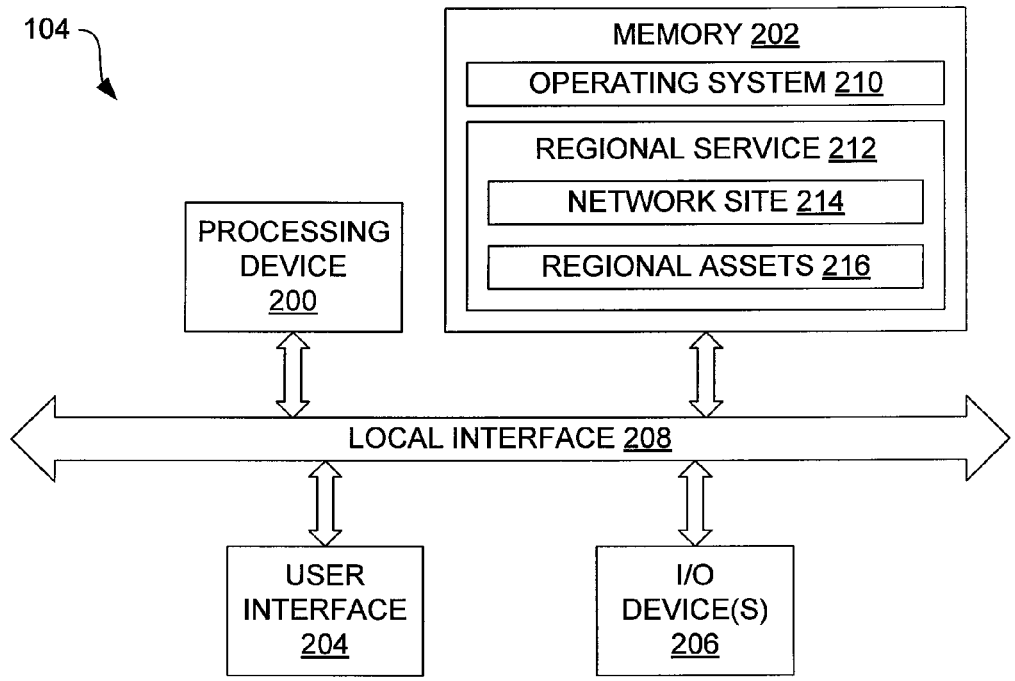
FIG. 2 is a block diagram of an embodiment of a server computer shown in FIG. 1.

FIG. 2 is a block diagram illustrating an example architecture for one of the server computers 104. The computer 104 of FIG. 2 comprises a processing device 200, memory 202, a user interface 204, and at least one I/O device 206, each of which is connected to a local interface 208.

The processing device 200 can include a central processing unit (CPU) or an auxiliary processor among several processors associated with the computer 104, or a semiconductor based microprocessor (in the form of a microchip). The memory 202 includes any one of or a combination of volatile memory elements (e.g., RAM) and nonvolatile memory elements (e.g., hard disk, ROM, tape, etc.).

The user interface 204 comprises the components with which a user interacts with the computer 102. The user interface 204 may comprise, for example, a keyboard, mouse, and a display, such as a cathode ray tube (CRT) or liquid crystal display (LCD) monitor. The one or more I/O devices 206 are adapted to facilitate communications with other devices and may include one or more communication components such as a modulator/demodulator (e.g., modem), wireless (e.g., radio frequency (RF)) transceiver, network card, etc.

The memory 202 comprises programs (i.e., logic) including an operating system 210 and a regional service 212. The operating system 210 controls the execution of other programs and provides scheduling, input-output control, file and data management, memory management, and communication control and related services. The regional service 212 comprises part of the overall network-based service offered by the organization at issue. More particularly, the regional service 212 comprises a regional version of the network-based service that is offered in a particular geographical region, such as a particular country. The regional service 212 comprises a regional network site 214 and regional assets 216. In some embodiments, the regional network site 214 comprises a regional version of a web site that offers the network-based service to customers within that region. Although the regional network site 214 is described herein as a "version" of a particular site, it is to be appreciated that the regional network site, as each other regional network site, is a distinct site that is separately operated and that is separately accessible using a unique address, such as a unique universal resource locator (URL). In some embodiments, the regional assets 216 comprise customer assets that are specific to the region, such as customer payment information, customer shopping carts, customer shipping information, and customer contact information. Furthermore, it is to be appreciated that the regional assets 216 need not comprise part of the regional service. For example, in alternative embodiments, the regional assets can be stored in one of the storage computers 108.

Figure 3:
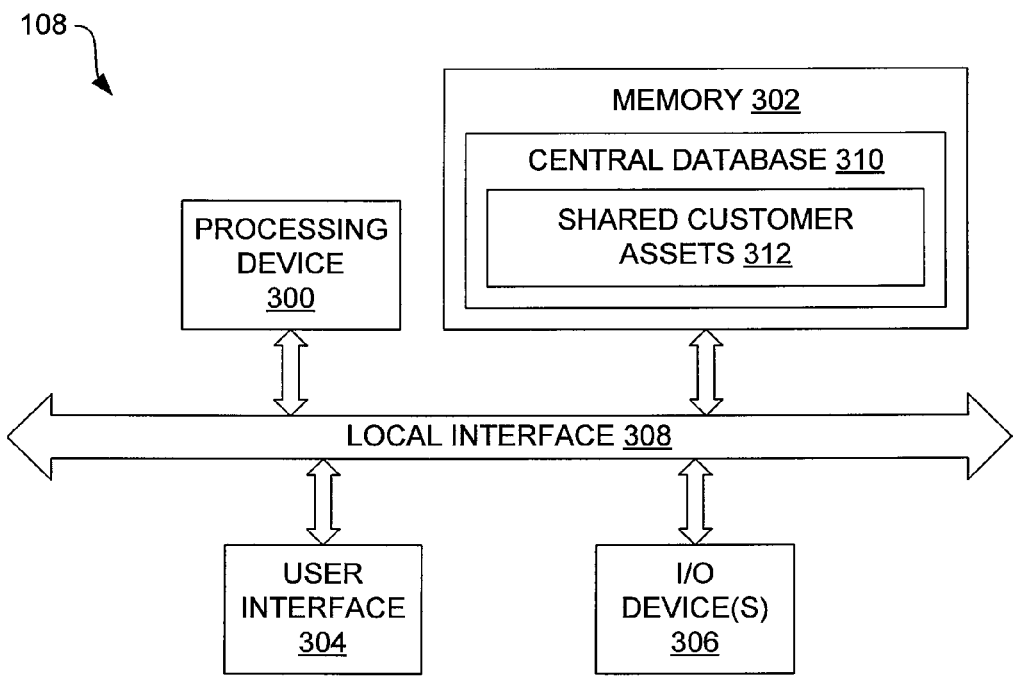
FIG. 3 is a block diagram of an embodiment of a storage computer shown in FIG. 1.

FIG. 3 is a block diagram illustrating an example architecture for a storage computer 108 shown in FIG. 1. As indicated in FIG. 3, the storage computer 108 may comprise many of the same components as the customer computer 102 shown in FIG. 2, including a processing device 300, memory 302, a user interface 304, and at least one I/O device 306, each of which is connected to a local interface 308. In some embodiments, those components have the same or similar construction and/or function of like-named components described above in relation to FIG. 2. Accordingly, a detailed discussion of the components of FIG. 3 is not presented herein. In other embodiments, however, the storage "computer" 108 may take the form of a mass storage device. In either case, however, the storage computer 108 at least includes memory 302 that can be accessed by the server computers 104.

As indicated in FIG. 3, the memory 302 at least comprises a central database 310 that stores shared customer assets 312. As used in this context, the term "shared" indicates that the assets can be shared among different regional services, not among different customers. Therefore, each customer's data is maintained separate, at least in terms of accessibility, from the data of other customers. Furthermore, although the memory 302 is indicated as comprising a "central database," it is to be appreciated that the database can comprise a portion of a central database, for instance when multiple storage computers 108 are used.

Example systems having been described above, operation of the systems will now be discussed. In the discussions that follow, flow diagrams are provided. Process steps or blocks in the flow diagrams may represent modules, segments, or portions of code that include one or more executable instructions for implementing specific logical functions or steps in the process. Although particular example process steps are described, alternative implementations are feasible. Moreover, steps may be executed out of order from that shown or discussed, including substantially concurrently or in reverse order, depending on the functionality involved.

Figure 4:
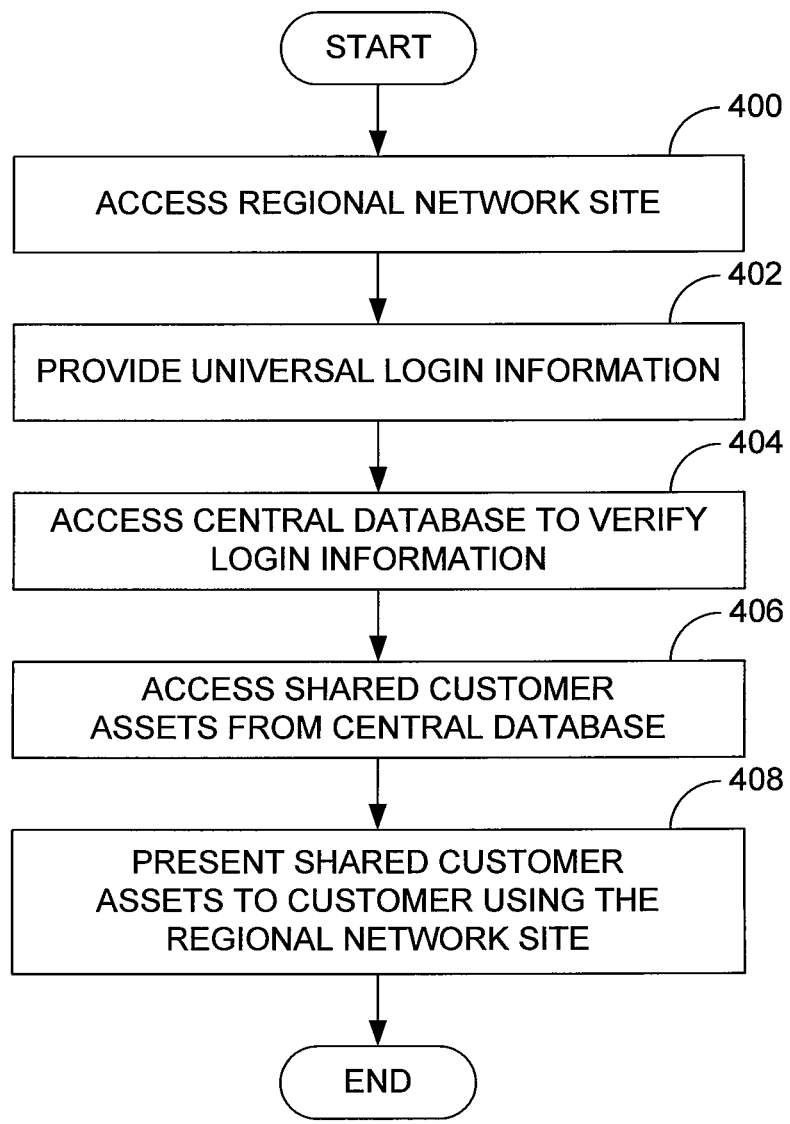
FIG. 4 is a flow diagram that illustrates an embodiment of a method for sharing customer assets.

FIG. 4 illustrates an example method for sharing customer assets. Beginning with block 400, a customer accesses a regional network site. By way of example, the customer accesses a regional web site using a browser that executes on the customer's computer. Next, in block 402, the customer provides universal login information to the regional network site. The term "universal" is used herein to indicate that the login information can be used to access any of the regional network sites associated with the network-based service. Accordingly, a single customer account can be used to access each of the various site versions provided in the various geographical regions (e.g., countries). By way of example, the universal login information comprises a universal username and a universal password associated with the universal username.

Once the universal login information has been provided by the customer, the regional service accesses the central database to verify the universal login information, as indicated in block 404. After the universal login information has been verified, the regional service accesses shared customer assets from the central database, as indicated in block 406. In some embodiments, the shared customer assets include image data of the customer, such as photographic images, photograph albums, and video data that are shared by and are accessible to each regional service. In such cases, the shared customer assets need only be stored in the central database, thereby obviating the need to duplicate data storage or link independent network sites.

Once the shared customer assets have been accessed, they can be presented to the customer using the regional network site, as indicated in block 408. At that point, the customer can manipulate the shared customer assets in terms of editing the assets, arranging the assets in desired groupings, ordering prints, ordering goods that incorporate the assets, and the like.

Figure 5:
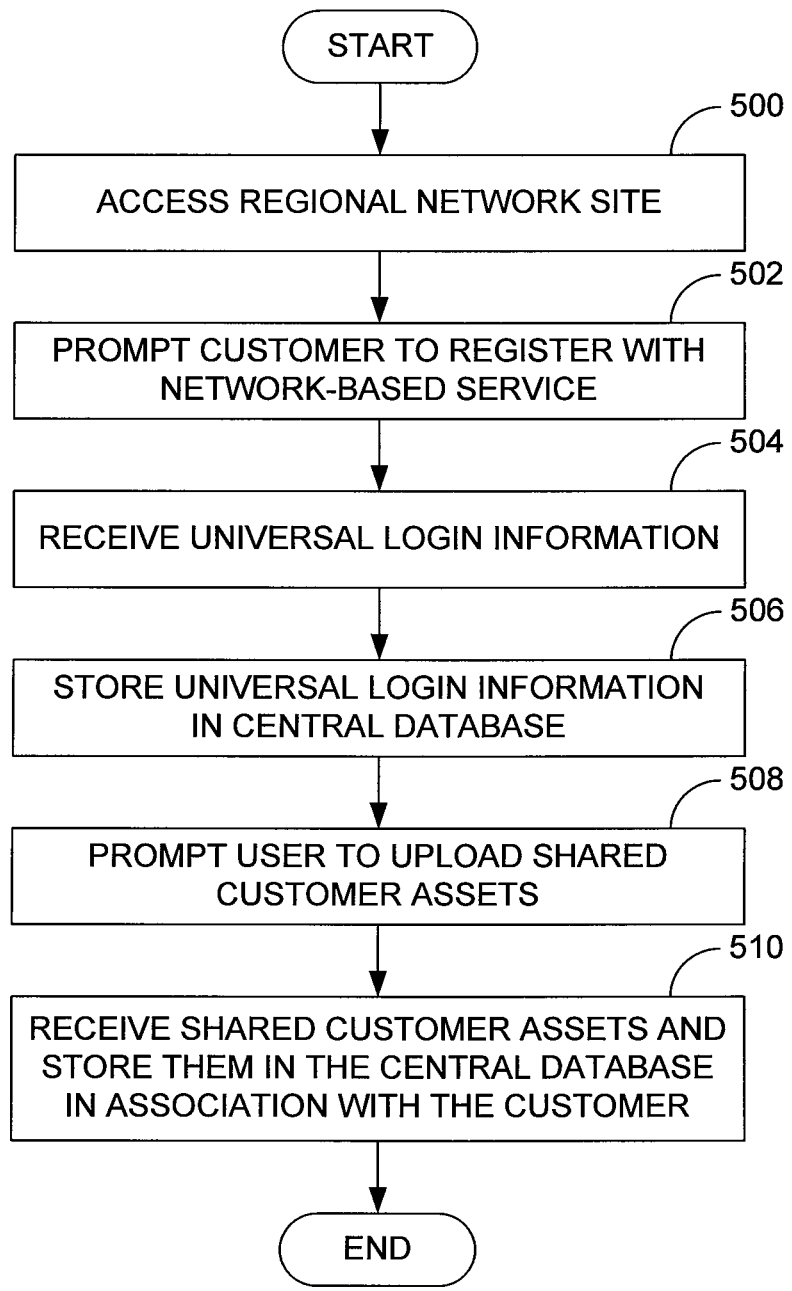
FIG. 5 is a flow diagram that illustrates an embodiment of a method for registering with a network-based service that shares customer assets.

FIG. 5 illustrates an example method of registering with a network-based service. Beginning with block 500, a customer accesses a regional network site. By way of example, the customer accesses a regional web site using a browser that executes on the customer's computer. Assuming that the customer has not yet registered with the network-based service, the customer is prompted to register, as indicated in block 502. More particularly, the customer can be prompted to provide universal login information that can be utilized to log in to any one of the regional network sites associated with the network-based service. Such universal login information can comprise a universal username and a universal password associated with the universal username. With reference to block 504, the universal login information is received and, as indicated in block 506, the universal login information is stored by the regional service in the central database. By storing the universal login information in the central database, the login information will be available to each of the regional services and the customer will be able to log in to any the network sites associated with those services using the same information.

Referring next to block 508, the customer can be prompted, for example using the regional network site, to upload shared customer assets, such as those described above. Accordingly, by way of example, the customer can be prompted to upload one or more of photographic images or video data in the form of one or more data files. If such assets are uploaded, they are received by the regional service and stored in the central database in association with the customer, as indicated in block 510. Assuming no further action is desired by the customer, flow for the registration session is terminated.

Figure 6A:
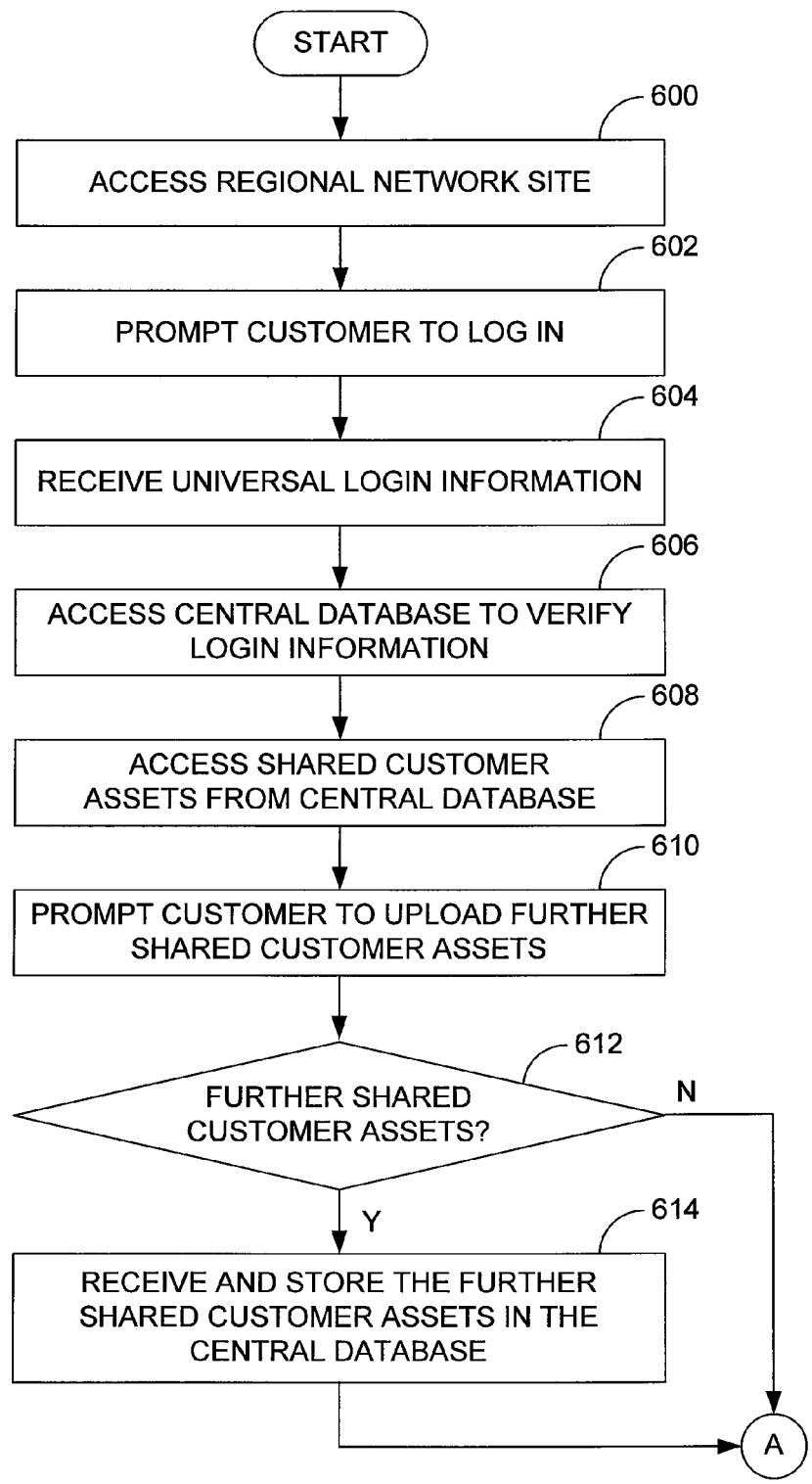
FIGS. 6A and 6B illustrate a flow diagram that of an embodiment of a method for using a network-based service that shares customer assets.
Figure 6B:
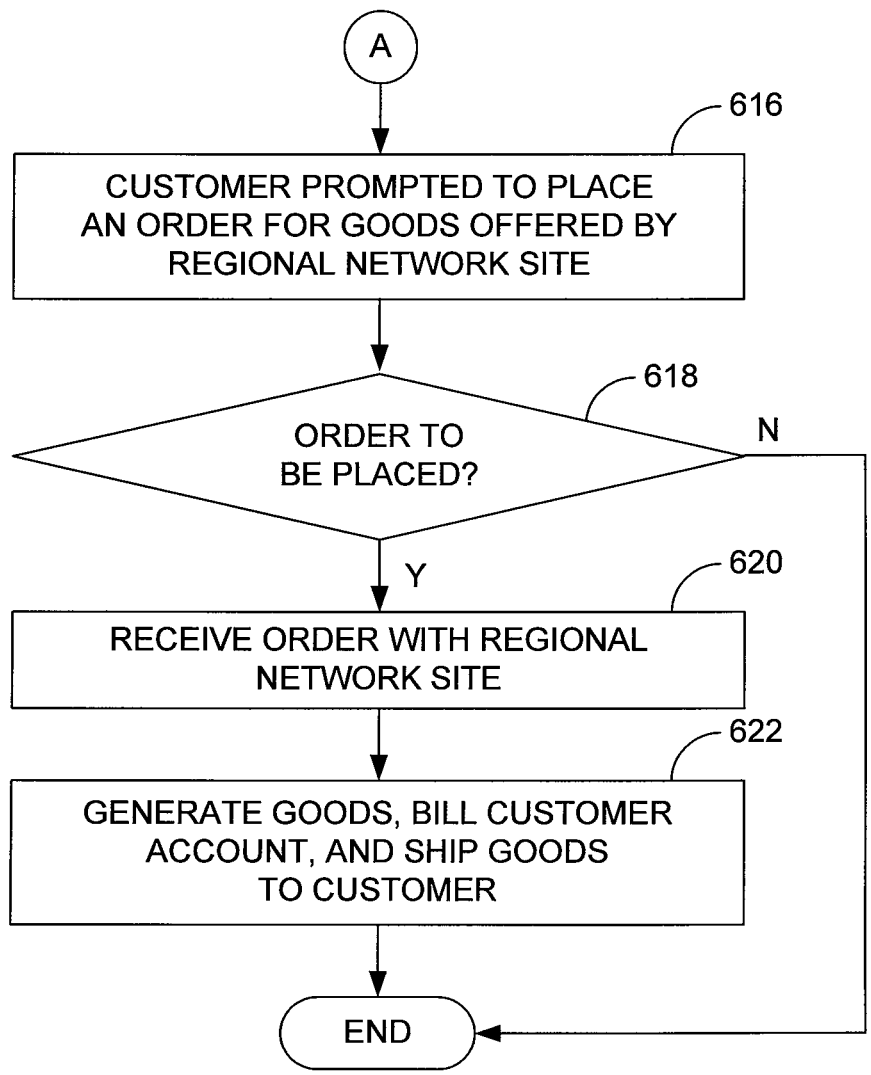

FIGS. 6A and 6B illustrate an example method for using a network-based service. Beginning with block 600 of FIG. 6A, a customer accesses a regional network site. By way of example, the customer accesses the same regional web site with which the customer registered in the method of FIG. 5 or one of the other regional network sites. Once the regional network site is accessed, the regional network site prompts the customer to log in, as indicated in block 602. The customer can then enter, and the regional network site can then receive, the customer's universal login information, as indicated in block 604. Again, the login information can comprise a universal username and a universal password associated with the universal username. Next, with reference to block 606, the regional network service can access the central database to verify the login information.

Assuming the universal login information entered by the customer is verified, flow continues to block 608 at which the regional network service accesses the shared customer assets associated with the customer's account. Again, the shared customer assets can comprise, for example, photographic images, photograph albums, or video data. In addition, the customer can be prompted to upload further assets, as indicated in block 610. Referring to decision block 612, if the customer wishes to upload further assets, flow continues to block 614 at which the further assets are received and stored as shared customer assets in the central database.

If no further customer assets were to be uploaded (block 612) or if those further customer assets were uploaded (block 614), flow continues to block 616 of FIG. 6B at which the customer is prompted to place an order for goods. By way of example, the goods can comprise goods that are unique to the region in which the regional network site is operated, for example a particular country. Regardless, flow from that point depends upon whether goods are to be ordered, as indicated in decision block 618. If goods are to be ordered, flow continues to block 620 at which the order is received with the regional network site and then to block 622 at which the goods are produced, the customer account is billed, and the goods are shipped to the customer. Notably, the billing transaction and shipping can be processed using the regional assets. In particular, the transaction can be processed using regional billing information and the shipping can be processed using a local address located, both of which are stored by the regional service.

Assuming no other actions are desired by the customer, the flow for the use session is terminated.

The following are claimed:

1. A method for sharing customer assets, the method comprising:
   receiving with a first regional service universal login information provided by a customer, the first regional service comprising one of multiple regional services that each comprises a distinct version of a website offering a network-based service that is specific to a particular geographical region for which the website is being offered;
   accessing a central database with the first regional service to verify the universal login information, wherein the central database is accessible to each of the multiple regional services; and
   accessing the central database with the first regional service to access shared customer assets that are associated with the customer, wherein the shared customer assets stored in the central database are accessible to each of the multiple regional services to enable the customer to access different versions of the website with the universal login information.

2. The method of claim 1, wherein receiving universal login information comprises receiving the universal login information with a web site hosted by the first regional service.

3. The method of claim 1, wherein receiving universal login information comprises receiving a universal username and a universal password associated with the universal username.

4. The method of claim 1, wherein each regional service hosts a regional web site that is specific to a particular geographic region.

5. The method of claim 1, wherein the particular geographical regions comprise different countries.

6. The method of claim 1, further comprising the first regional service presenting the shared customer assets to the customer.

7. The method of claim 6, wherein presenting the shared customer assets comprises presenting the assets to the customer with a web site hosted by the first regional service.

8. The method of claim 1, further comprising receiving with a second regional service the universal login information and accessing the central database with the second regional service to verify the universal login information.

9. The method of claim 8, further comprising accessing the central database with the second regional service to access shared customer assets stored in the central database.

10. The method of claim 1, wherein the shared customer assets comprise one or more of photographic images, photograph albums, and video data.

11. A non-transitory computer-readable medium that stores a regional service, the regional service comprising one of multiple regional services that each comprises a distinct version of websites that offer a global network-based service, wherein each regional service is specific to a particular geographical region for which the websites are being offered, the regional service comprising:
    logic configured to receive universal login information provided by a customer;
    logic configured to access a central database to verify the universal login information; and
    logic configured to access the central database to access shared customer assets that are specific to the customer and stored in the central database, wherein the shared customer assets stored in the central database are accessible to each of the multiple regional services to enable the customer to access different versions of the websites with the universal login information.

12. The non-transitory computer-readable medium of claim 11, wherein the logic configured to receive comprises logic configured to generate a web page that can be viewed by the customer in a web browser.

13. The non-transitory computer-readable medium of claim 11, wherein the particular geographical regions comprise different countries.

14. The non-transitory computer-readable medium of claim 11, further comprising logic configured to present the assets to the customer within a web site hosted by the regional service.

15. The non-transitory computer-readable medium of claim 11, wherein the shared customer assets comprise one or more of photographic images, photograph albums, or video data.

16. A system for sharing customer assets, the system comprising:

a central database that stores shared customer assets; and
one or more servers connected to the database and providing:

a first regional service operated as a first version of a website that offers a global network-based service and that is specific to a first geographical region for which the website is being offered, the first regional service being configured to access the shared customer assets stored in the central database and present the shared customer assets to verified customers; and a second regional service operated as a second version of the website that offers the global network-based service and that is specific to a second geographical region different than the first geographical region, the second regional service being configured to access the shared customer assets stored in the central database and present the shared customer assets to verified customers;

wherein a customer can access both the first and second regional services using the same login information.

17. The system of claim 16, wherein the first regional service hosts a first regional web site with which the customer interfaces.

18. The system of claim 17, wherein the second regional service hosts a second regional web site with which the customer interfaces.

19. The system of claim 18, wherein the first and second geographical regions comprise distinct countries.

20. The system of claim 16, wherein the first and second regional services are configured to present the shared customer assets to the customer in separate web sites respectively hosted by the first and second regional services.

* * * * *